(12) United States Patent
Stolpe (10) Patent No.: US 8,271,984 B2
(45) Date of Patent: Sep. 18, 2012

(54) METHOD FOR CREATING AN OPTIMIZED FLOWCHART FOR A TIME-CONTROLLED DISTRIBUTION COMPUTER SYSTEM

(75) Inventor: Ralf Stolpe, Hövelhof (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 925 days.

(21) Appl. No.: 12/281,488

(22) PCT Filed: Feb. 28, 2007

(86) PCT No.: PCT/EP2007/001717
§ 371 (c)(1),
(2), (4) Date: Oct. 31, 2008

(87) PCT Pub. No.: WO2007/101590
PCT Pub. Date: Sep. 13, 2007

(65) Prior Publication Data
US 2010/0043001 A1 Feb. 18, 2010

(30) Foreign Application Priority Data
Mar. 3, 2006 (DE) .......................... 10 2006 010 400

(51) Int. Cl.
*G06F 9/46* (2006.01)
*G06F 13/00* (2006.01)
*G06F 15/16* (2006.01)
*G06F 13/36* (2006.01)
*H04J 1/14* (2006.01)

(52) U.S. Cl. ........ 718/102; 709/236; 719/313; 719/318; 370/242; 370/252; 710/112; 710/117; 710/118; 710/124

(58) Field of Classification Search .................... None
See application file for complete search history.

(56) References Cited

U.S. PATENT DOCUMENTS
7,711,880 B2 * 5/2010 Fredriksson ................... 710/117
2002/0087734 A1 * 7/2002 Marshall et al. ............... 709/310
(Continued)

FOREIGN PATENT DOCUMENTS
DE 10211517 A1 9/2002

OTHER PUBLICATIONS

Tom In der Rieden; An Approach to the Pervasive Formal Specification and Verification of an Automotive System; pp. 115-124; ACM 2005.*

(Continued)

*Primary Examiner* — Meng An
*Assistant Examiner* — Abdullah Al Kawsar
(74) *Attorney, Agent, or Firm* — Orrick Herrington & Sutcliffe, LLP (57) ABSTRACT

A method is described and presented for creation of an optimized schedule for execution of a functionality by means of a time-controlled distributed computer system, in which the distributed computer system and the functionality have a set of (especially structural and functional) elements of at least one element class and the elements are at least partially in a dependence. The method according to the invention, in which the task is solved, is initially and essentially characterized by the fact that the dependences between the elements are recognized, classified and the elements are assigned to corresponding dependence classes, and that optimization of schedule occurs by coordination of elements of at least one dependence class.

15 Claims, 5 Drawing Sheets

U.S. PATENT DOCUMENTS

| | | | |
|---|---|---|---|
| 2005/0138625 A1* | 6/2005 | Carroll et al. | 718/104 |
| 2005/0254518 A1* | 11/2005 | Fujimori | 370/466 |
| 2006/0080666 A1* | 4/2006 | Benedetti et al. | 718/104 |
| 2007/0022209 A1* | 1/2007 | Delvai et al. | 709/236 |
| 2007/0041396 A1* | 2/2007 | Kanajan | 370/442 |
| 2009/0125592 A1* | 5/2009 | Hartwich et al. | 709/206 |
| 2010/0023945 A1* | 1/2010 | Tsien | 718/101 |

OTHER PUBLICATIONS

Thomas M. Galla; Standard Software Components for X-by-Wire Networks; Proceedings of the Embedded World 2004; pp. 12.*

Schedulability Analysis for Distributed Heterogeneous Time/Event Triggered Real-Time Systems, 15th Euromicro Conference on Real-Time Systems (ECRTS 2003), Porto, Portugal, Traian Pop et al., Jul. 2-4, 2003, pp. 257-266.

Bus Access Optimization for Distributed Embedded Systems Based on Schedulability Analysis, Design, Automation and Test in Europe Conference (Date 2000), Paris, France, Paul Pop et al., Mar. 27-30, 2000, pp. 567-574.

Scheduling with Optimized Communication for Time-Triggered Embedded Systems, 7th International Workshop on Hardware/Software Codesign Rome, Italy, Paul Pop et al., May 3-5, 1999, pp. 178-182.

Scheduling of Conditional Process Graphs for the Synthesis of Embedded Systems, Design, Automation and Test in Europe Conference (Date 1998), Paris, France, Petru Eles et al., Feb. 23-26, 1998.

ELE539A: Optimization of Communication Systems Lecture 11: Layering as Optimization Decomposition I—Professor M. Chiang, Electrical Engineering Department, Princeton University, Professor M. Chiang, Mar. 1, 2006, pp. 1-52.

ELE539A: Optimization of Communication Systems, Lecture 12: Distributed Algorithms and Decomposition Methods, Professor M. Chiang, Electrical Engineering Department, Princeton University, Professor M. Chiang, Feb. 25, 2005, pp. 1-24.

Allocation of Precedence-Constrained Tasks to Parallel Processors for Optimal Execution; 8205 Microprocessing and Microprogramming 35 (1992) September, Nos. 1/5, Amsterdam, NL, Rina Das et al., pp. 237-244.

Optimization Flow Control—I: Basic Algorithm and Convergence, Steven H. Low et al., IEEE/ACM Transactions on Networking, vol. 7, No. 6, Dec. 1999, pp. 861-879.

Ryosuke Kurebayashi and Hiroaki Nishikawa: "Program allocation process for the real-time processing by a data-controlled processor", The IEICE Transactions, Japan, The institutes of Electronics, information and Communication Engineers, Oct. 1, 2003, vol. J86-D-1, No. 10, pp. 721-732 (with English translation of relevant part).

Takao Kudo, Masanori Hariyama and Michitaka Kameyama: "High level synthesis of a VLSI processor with in of logic accumulator by means of a genetic algorithm", The IPSJ Transactions, Japan, information Processing Society of Japan, May 15, 2003, vol. 44, No. 5, pp. 1206-1215 (with English translation of relevant part).

Hiroyuki Hattori: "Communication specification for the rise of the Portierbarkeit of a board-internal application package and implementing of the same", design Wave Magazines, Japan, CQ Publishing Co., Ltd., Sep. 1, 2005, vol. 10, No. 9, pp. 124-133 (with English translation of relevant part).

BMW, DaimierCrysler: "FlexRay für verteilte Anwendungen im Fahrzeug", Electronic Automotive, May 2001, pp. 40-43 (with English language machine translation).

Paul Pop et al., Chapter 3—"Distributed Hard Real-Time Systems", Analysis and Synthesis of Distributed Real-Time Embedded Systems, 2004, pp. 41-47.

Paul Pop et al., Chapter 4—"Scheduling and Bus Access Optimization for Time-Driven Systems", Analysis and Synthesis of Distributed Real-Time Embedded Systems, 2004, pp. 65-83.

Dar-Tzen Peng et al, "Assignment and Scheduling Communicating Periodic Tasks in Distributed Real-Time Systems", IEEE Transactions on Software Engineering, vol. 23, No. 12, Dec. 1997, pp. 745-758.

Dar-Tzen Peng et al., "Optimal Scheduling of Cooperative Tasks in a Distributed System Using an Enumerative Method", IEEE Transactions on Software Engineering, vol. 19, No. 3, Mar. 1993, pp. 253-267.

Krithi Ramamritham, Short Notes, "Allocation and Scheduling of Precedence-Related Periodic Tasks", IEEE Transactions on Parallel and Distributed Systems, vol. 6, No. 4, Apr. 1995, pp. 412-420.

Ola Redell, "Global Scheduling in Distributed Real-Time Computer Systems an Automatic Control Perspective", Technical Report, Department of Machine Design, Royal Inst. of Technology, S-100 44 Stockholm, TRITA-MMK 1998:6, ISSN 1400-1170, ISRN KTH/MMK—98/6—SE, 59 pages.

Thomas Ringler, "Developing tools for time-controlled systems", Automotive Engineering Partners Jun. 2001—pp. 54-56 (with English machine translation).

* cited by examiner

METHOD FOR CREATING AN OPTIMIZED FLOWCHART FOR A TIME-CONTROLLED DISTRIBUTION COMPUTER SYSTEM

FIELD OF THE INVENTION

The invention concerns a method for creation of an optimized schedule to accomplish a functionality by means of a time-controlled distributed computer system, in which the distributed computer system and the functionality have a set of (especially structural and functional) elements of at least one element class, and the elements are at least partially dependent on each other. The invention also concerns a computer program geared toward execution of the method.

BACKGROUND OF THE INVENTION

Distributed computer systems of the type at issue have long been known and are increasingly used in almost all areas of engineering, especially in those areas in which complex, spatially extensive processes are to be controlled in the broadest sense.

In modern measurement, regulation and control systems, central computer systems with distributed sensors and actuators are being increasingly replaced by distributed computer systems, in which several spatially distributed computing nodes assume local process control tasks and are connected directly to the process being influenced via the corresponding computing nodes (i.e., on a short path) by means of corresponding sensors and actuators. In the case of control, the local partial processes of an overall process are functionally linked to each other, so that it is useful or even necessary to connect the computing nodes allocated to the partial processes to each other via a data channel, so that the quantities of state that describe the process, which are not available at all computing nodes, can be exchanged between computing nodes and then utilized locally by any computing node for process control.

Depending on the field of application, different requirements are imposed on distributed computer systems, for example, with reference to data throughput via the data channel, expandability with respect to architecture and functionality, reliability and error tolerance of communication and reliable time scheduling capability of the functionality implemented on the distributed computer system, but also with respect to physical transmission medium of the data channel. From these sometimes contradictory requirements on a distributed computer system, different systems have emerged over time that are geared to these demands to quite different degrees; LIN, CAN, TTCAN, MOST, Bluetooth, Byteflight, TTP and FlexRay can be mentioned here as examples.

It is apparent from the examples just mentioned that the computing nodes of the distributed computer system can be any technical units that are capable of electronically performing calculations in the general sense; computing nodes can be control devices with connected sensors and actuators, or just as much they can be less capable field devices of a simple home installation system or extremely high-performance modules of a simulation computer.

The configuration of the data channel or data channels connecting the computing nodes is of no more importance than the area of application and the precise technical configuration of the computing nodes of the distributed computer system; it is only essential that the computing nodes can exchange messages via the data channel, which is physically configured and arbitrarily configured in terms of the employed communications protocol.

In the area of highly dynamic processes with increased reliability requirements (automotive, avionics, X-by-Wire applications), time-controlled distributed computer systems are being increasingly used, like TTCAN (time-triggered CAN), TTP (time-triggered protocol) and FlexRay, whose time behavior, which applies to the design of the functionality on the individual computing nodes and exchange of data via the data channel between the computing nodes, can be at least partially scheduled and stipulated, so that the time behavior can also be guaranteed.

Communication via the data channel of a time-controlled distributed computer system can also be event-controlled at specific time intervals, which means random events and processes can arbitrarily occupy the data channel in certain well defined time intervals (time slots), but occupation of the data channel for information exchange between the computing nodes of the distributed computer system is strictly scheduled in other time intervals. This means that in the time spaces not provided for event-driven execution of functionality on the computing nodes and communication between the computing nodes, precisely stipulated computing nodes may only send precisely defined messages for precisely defined purposes at precisely defined times, and can also do this with certainty, since event-driven data exchange at these times is suppressed between nodes. Because of these properties, time-controlled distributed computer systems are especially suited for implementation of time-discrete scanning systems, which are based on a strictly periodic sequence of receipt of actual input values (especially from other computing nodes), calculation of output value/signals and release of the output value.

Stipulation of the time behavior of the time-controlled computer system ordinarily occurs through a schedule, in which it is precisely established which elements of the distributed computer system execute which elements of the functionality to be performed by means of the computer system in which specific time sequence.

It can easily be imagined that the design of such a schedule, based on the enormous number of degrees of freedom, in order to assign functional elements—i.e., partial functions-structural elements—i.e., computing nodes or subunits of a computing node—or in order to arrange functional elements in time relative to each other, represents a problem that is extremely difficult to grasp and solve, especially when not just any valid solution is to be found for the schedule from the set of all possible solutions, but an optimal solution according to specified criteria.

For example, it is known from the prior art to provide a graphic planning editor to facilitate the design of such a schedule, which makes it possible to graphically relate the individual structural and functional elements of the distributed computer system being planned and bring it into an overall time schedule, in which planning, however, is additionally supported by a so-called worst case execution time analysis (WCET analysis), whose result is the statement of the required time to execute a functionality (application, communication) on a specific computing node (Ringler, T: "Development Tool for Time-controlled Systems," Automotive Engineering Partners, June 2001, pages 54-56).

It is also known to use genetic algorithms for automatic creation of an optimized schedule (DE 102 11 517 A1). The method then starts from a possible solution for a schedule and varies it by several random processes. The additional possible solutions obtained from these random processes for the schedules are subjected to quality evaluation, in which the most appropriate schedule or schedules are then subjected to further random variation, evaluation and selection. By continuing this process, starting from an arbitrary and complete initial solution, i.e., a solution that includes all elements of the time-controlled distributed computer system, as well as its functionality, continuously "better" solutions are found, until the search process is finally interrupted. A drawback in the method, for example, is that one or more (complete) solutions for the schedule must be available as starting point of optimization, in which case no evaluation of the starting solution is possible, and it is also questionable how the starting solution is to be found.

SUMMARY OF THE INVENTION

The task of the present invention is to at least partially avoid the mentioned drawbacks in the creation of an optimized schedule for distributed computer systems.

This task is initially solved according to the invention and essentially in a method for creation of an optimized schedule for execution of a functionality by means of a time-controlled distributed computer system, in which the distributed computer system and the functionality have a set of elements of at least one element class and the elements are at least partially dependent on each other, in that the dependences between the elements are recognized, classified and the elements are assigned to corresponding dependence classes, and optimization of the schedule occurs by coordination of elements of at least one dependence class.

In contrast to the methods known from the prior art, the method according to the invention is preceded by analysis of the elements of the distributed computer system and the elements of the functionality to be executed on the distributed computer system. The elements of the distributed computer system are its computing nodes and possibly separately responding subunits of the computing nodes, like I/O groups, CPU, communication controllers and data channel interfaces.

The elements of the functionality to be executed on the distributed time-controlled computer system are function modules, which concern calculation of an application (for example, a control algorithm or execution of a time-controlled communication), time-controlled sending and receiving of messages with other computing nodes of the distributed computer system. These structural and functional elements can be assigned to corresponding element classes; for example, all functional elements responsible for sending of a signal form the element class of sending functions and all elements responsible for calculation of an application on a computing node form the element class of application functions.

The method according to the invention is not fixed or limited to specific element classes, but instead the formation of quite different and arbitrary element classes is possible, and definition of the element classes is up to the user of the method according to the invention.

It was recognized according to the invention that the elements of the element classes can be dependent on each other, i.e., be in a certain relation to each other, or also no relation at all; this can apply both for elements of the same element class and for elements of different element classes.

For example, elements from the element class of application functions are dependent on each other, when the initial value, calculated using a first application function, serves as the initial value of a subsequent application function. Consequently, a distinction can be made between the dependence class of application functions that use the initial value of another application function as input value and the dependence class of those application functions that are not dependent on such an input value.

On the one hand, by classification of elements of the time-controlled distributed computer system and its functionality according to certain dependence criteria, and, on the other hand, by the resulting dependence classes, and also the restriction of coordination of elements to at least one dependence class, it is possible according to the invention to begin optimization of the schedule by coordination of only a useful subset of elements. In contrast to the method known from the prior art, it is not necessary for the method according to the invention to start from an already existing complete schedule, but the schedule can be developed by optimizing merely a subset of elements in steps.

"Coordination of elements" is to be understood, in general, to mean the processes of a) modification of a list/combination of elements, b) evaluation of the modification and c) selection of a modification/several modifications. Modification of a combination of elements can merely represent sorting of elements in time or space, but grouping of the combined elements into a new element can also occur.

Modification of a grouping of elements per se is stipulated in deterministic optimization methods by the optimization method itself. On the other hand, during use of stochastic optimization methods, and also genetic algorithms, several changes in the grouping of elements per random event are made, whereupon the obtained modifications are evaluated by using a quality criterion. The best optimization result or the best optimization results are then successively further improved in another coordination step.

Different quantities are suitable as quality criterion for optimization of a schedule by coordination of elements, and the choice of a corresponding quality criterion finally depends on the design objectives that are considered decisive for the creation of an optimized schedule. Possible quality criteria, for example, can be based on bus utilization, period duration of the schedule, number of messages to be transmitted, number of required computing nodes and the worst case execution time of the functionality to be executed on the computer system or on the partial functionalities to be executed on the computing nodes.

According to a first advantageous embodiment of the invention, the method is designed, so that the elements of at least one dependence class are fully coordinated before the elements of another dependence class are coordinated. "Fully" is not to be understood here absolutely, since it can happen that not all elements can actually be coordinated; fully is therefore to be understood in the sense of "fully, if performable, or if the problem permits." Through this expedient, the clarity of optimization gained by the method according to the invention for the schedule is consistently continued by coordination of useful subsets of elements (dependence classes). If, during this procedure, a switch is made from coordination of one dependence class to a new dependence class, the elements of the already coordinated dependence classes need no longer be considered in the coordination and are treated equally as fixed points in the partially designed schedule.

In another preferred practical example of the method according to the invention, during coordination of elements of at least one dependence class, the elements originating from the same element class are coordinated separately. This procedure has proven to be particularly advantageous in certain element classes, for example, during coordination of communication functions of the same type. It is then expedient if several transmitting functions send packaged signals from identical nodes to identical nodes within intersecting time intervals in messages. In this case, each signal need not be sent separately with its own message via the data channel, but the combining of several signals into a single message works, which can be sent with a single transmitting function, if the sum signal finds room in a single message (frame).

In another preferred practical example of the method according to the invention, on the other hand, it is advantageous during coordination of elements to coordinate the elements of different element classes in combined fashion; for example, in this case, the combined coordination of elements from the element class of application functions is stated together with elements from the element class of the computing nodes; without this combined coordination, it would not be possible to assign an application function, which is not connected to any special computing node, to a computing node other than the one originally prescribed.

The method according to the invention is then executed particularly clearly when optimization is conducted iteratively within at least one dependence class, in which case only a selection (i.e., a subset) of elements of the dependence class is coordinated in each step. Numerous iteration steps are preferably conducted, until all elements of the dependence class are coordinated or until no additional elements of the dependence class can be coordinated; again, it depends on the problem whether all elements can actually be coordinated.

By establishing the first selection of elements of the dependence class, the solution set theoretically attainable with the method is restricted, since coordination (exchange, assignment, merging) of elements of the first selection from the dependence class and of elements of subsequent subsets from the dependence class is not possible.

A larger set of solutions from the entire solution set of an optimized schedule is attainable in another embodiment of the method, if coordination is conducted within one iteration step repeatedly with another element selection from a dependence class, and the subsequent iteration step is continued with the coordinated element selection that achieved the best optimization result in the preceding iteration step. In principle, the final optimization result of the schedule can be better in this variant of the method according to the invention than when only a single element selection is used in each iteration step; to pay for this, a correspondingly higher running time for execution of the method must be reckoned with.

In another advantageous embodiment of the invention, during optimization of the schedule, consistency tests with reference to the achieved (partial) result are conducted, which are directed especially toward checking compliance with the stipulated and/or system-intrinsic boundary conditions. For example, it can be stipulated by the user that a certain application function is to be calculated on a specific computing node of the computer network, which can be useful, for example, when the result of the calculation of this application function is to be directly issued via a certain I/O interface of the corresponding computing node, for example, because only this computing node has this I/O interface. If the consistency test fails, the preceding optimization or coordination step is discarded and replaced by another modified coordination step.

In a preferred embodiment of the method according to the invention, the elements or a selection of elements of the distributed time-controlled computer system or the functionality to be implemented on the computer system is assigned to the class of simple dependences or the class of complex dependences. All elements that are not dependent on a state or initial value of the corresponding other element are situated in this simple dependence.

For example, if two application functions merely supply a third application function, the two application functions are in a simple dependence relation. However, if a first application function indirectly supplies a third application function via a second application function, the first and second application functions are then in a complex dependence relation.

The distinction between the class of simple and complex dependences is therefore useful, because elements that are only simply dependent on each other can be coordinated arbitrarily by assignment or grouping. On the other hand, elements that are in a complex dependence relation with each other cannot be grouped (for example, in the sense of simultaneous execution), since one of the elements must be executed in timely fashion before the other element, so that it can use the state or output of the first element for its calculation.

In the previous practical example of the method according to the invention it is particularly advantageous, if coordination of the elements of the class of simple dependences occurs before coordination of the elements of the class of complex dependences.

In a preferred practical example, the method according to the invention is used with a distributed time-controlled computer system, which is based on the FlexRay standard and has at least two computing nodes connected via a FlexRay bus, in which the element classes, used for optimization of the schedule, include at least one of the classes FTCom, transmission, application-task, signals, messages and computing nodes, in which the class of FTCom tasks is divided into the classes FTCom-Sender and FTCom-Receiver task. The employed terms involve the ordinary designations of the hardware and software components of a FlexRay system.

FTCom tasks serve for writing/reading of messages by the computing node into/out of the buffer of the communication controller, which is assigned to a computing node, whereas transmission tasks serve for transmission of messages on the bus side. The term "task" is not to be understood restrictively in the sense of task of an operating system, i.e., the smallest unit that can be scheduled and executed by the operating system, but instead task can also interpreted here as an abstract function, in which such a function can then be executed according to the schedule individually as a task (of an operating system) or several functions together—after coordination—as a task (of an operating system).

In order to achieve the greatest possible flexibility in optimizing the schedule of a FlexRay system, for preparation of coordination, a FlexRay message is assigned to each signal of the FlexRay system, which is linked to its own FTCom task. Only in this way are maximum degrees of freedom guaranteed for optimization of the schedule.

In a particularly advantageous embodiment of the method just described, FTCom tasks are assigned to the dependence class of simple dependences and coordinated, if they are of the same type (FTCom-Sender or FTCom-Receiver), if they can be assigned to the same application node, and if they have identical pairs of sending and receiving computing nodes or identical sending and receiving nodes. In the simplest case, FTCom tasks that have these properties are coordinated when their start times agree.

On the other hand, FTCom tasks can be assigned to the dependence class of complex dependences and coordinated when, as before, they are of the same type (FTCom-Sender or FTCom-Receiver) and when they can be assigned to the same application node and when their start-time intervals intersect.

In addition, it can also be useful to link coordination of FTCom tasks to their start times. In a particularly preferred embodiment of the method, FTCom tasks are therefore only coordinated when their start times deviate from each other by no more than a certain amount, this amount being stipulated, for example, by the user of the method; in the simplest case, agreement of the start times is required.

According to their task of coordinating transmission of messages on the bus, transmission tasks can be assigned to the dependence class of simple dependences and coordinated when their common signals initially do not surpass the maximum length of a FlexRay message; the length of a FlexRay message cannot be chosen arbitrarily, but instead is stipulated by the FlexRay protocol, in which several signals can be bundled in a FlexRay message and the FlexRay message can therefore certainly be a frame for several signals being transmitted. Assignment to the dependence class of simple dependences then occurs, in particular, when the transmission tasks additionally have the same start times.

Transmission tasks can usefully be assigned to the dependence class of complex dependences and coordinated, when their common signals do not exceed the maximum length of a FlexRay message (frame), when they can be assigned to identical sending application nodes and have intersecting start time intervals. In a preferred embodiment of the method according to the invention, coordination of transmission tasks is also linked to their start times. In this case, transmission tasks are coordinated when their start times deviate from each other no more than by a, say, stipulated (by the user) amount.

According to an independent teaching, the invention also concerns a computer program in order to execute the process steps just described, when the program is run on a data processing system.

In particular, there are now a number of possibilities of configuring and modifying the method and computer program according to the invention.

SUMMARY OF THE INVENTION

DETAILED DESCRIPTION OF THE INVENTION

Figure 1:
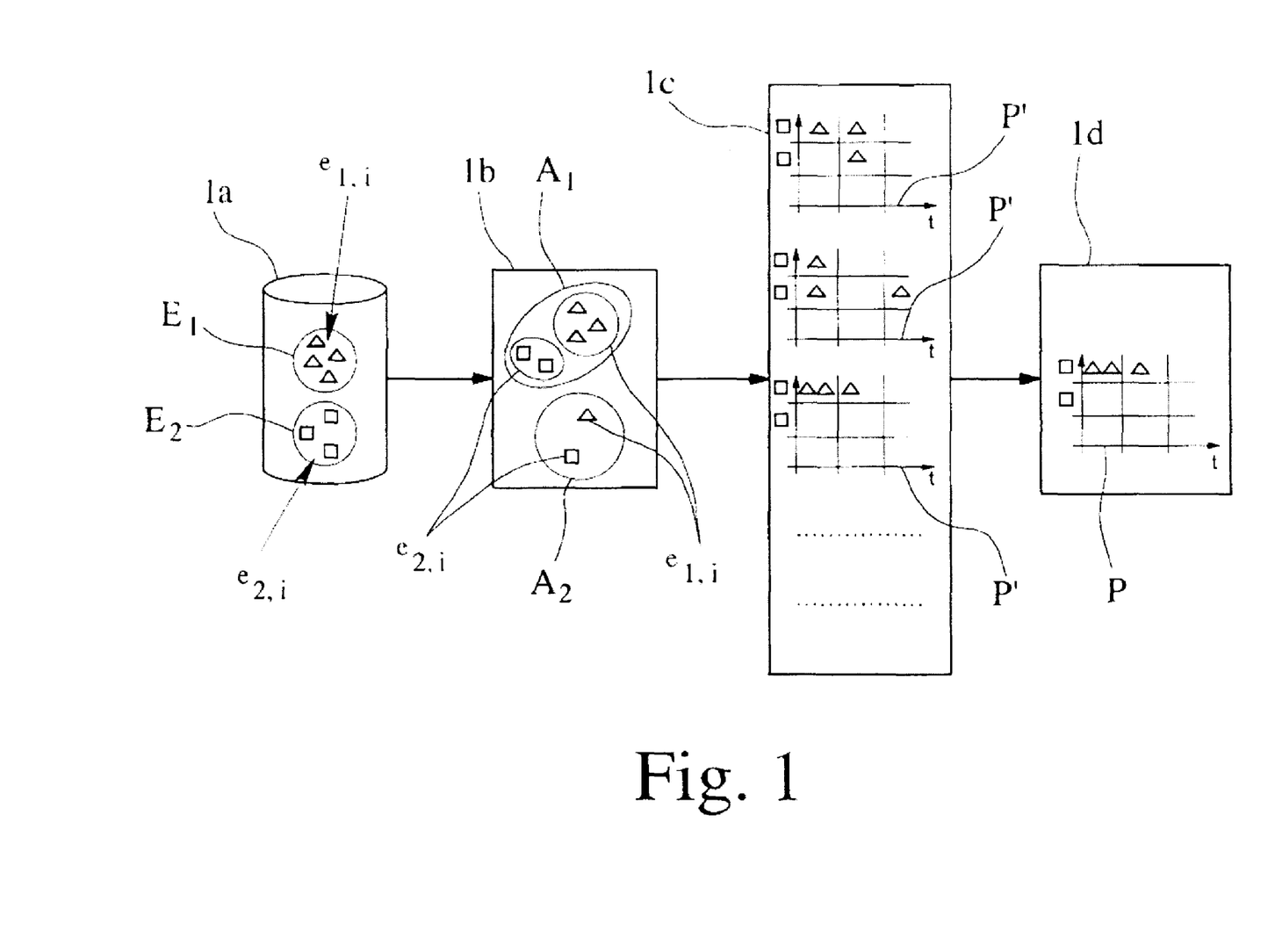
FIG. 1 shows optimization of a schedule according to a preferred practical example of the method according to the invention.

FIG. 1 shows a schematic overview of the essential components of the method according to the invention, which is usually executed by a data processing system and with its help an optimized schedule P can be created to execute a functionality by means of a time-controlled distributed computer system (not shown).

The distributed computer system and the functionality have a set of structural and functional elements $e1,i$, $e2,i$, which are assigned in the present case merely to two element classes E1, E2. Elements $e1,i$, $e2,i$ describe the distributed time-controlled computer systems and the functionality to be implemented by the computer systems. The elements $e1,i$, $e2,i$ can be dependent on each other, wherein the dependences in the general case can also exist between elements $e1,i$, $e2,i$ of different element classes.

In the practical example depicted in FIG. 1, the elements $e1,i$, $e2,i$ are known in the form of database entries in the database 1a. In a first process step 1b, the dependences between elements $e1,i$, $e2,i$ are recognized, the dependences are classified and the elements $e1,i$, $e2,i$ are assigned to corresponding dependence class A1, A2.

In the depicted practical example, two element classes E1, E2 and two dependence classes A1, A2 are randomly present; however, no dependence generally exists between the number of element classes Ei and the number of dependence classes Ai; the elements ei of a single element class Ei can be assigned to a number of dependence classes Ai, just like elements ei of a number of element classes Ei can merely be in a single dependence relation with only a single dependence class Ai.

In the practical example depicted in FIG. 1, the element class E1 is the class of application functions—symbolized by a triangle—and element class E2 is the class of computing nodes of the time-controlled distributed computer system-symbolized by the square. In the second process step 1c, optimization of the schedule P is schematically shown, which occurs by coordination of elements $e1,i$, $e2,i$ of at least one dependence class Ai; in the depicted practical example, optimization occurs in the second process step 1c by coordination of elements $e1,i$, $e2,i$, which belong to the dependence class Ai.

Coordination of elements is essentially understood to mean resorting, assignment and merging of elements ei, in which coordination of the elements $e1,i$, $e2,i$ in the practical example depicted in FIG. 1 consists of rearranging the elements $e1,i$ (application function) from the dependence class A1 in schedule P' and assigning these elements to the elements $e2,i$ (computing nodes) from the dependence class A1. The method depicted in FIG. 1 is also configured, so that the elements $e1,i$, $e2,i$ of dependence class A1 can be fully coordinated before the elements $e1,i$, $e2,i$ of the additional dependence class A2 are coordinated.

In the second process step 1c depicted in FIG. 1, coordination of elements $e1,i$, $e2,i$ occurs by an optimization method that has both deterministic and stochastic elements: "deterministic" because the determination of which elements can be coordinated is linked to fixed rules or conditions and "stochastic" because the choice of elements that are checked for coordination capability is a random choice. Several obtained variants P' of a schedule P are then evaluated by a quality criterion, which, however, is not shown in detail. When optimization is concluded or interrupted, an optimized schedule P is finally available as the result of the employed method, see process step 1d.

In the practical example according to FIG. 1, bus utilization in terms of time is used as quality criterion for calculation of an optimal solution. In other practical examples, not shown here, of the method according to the invention, the quality criterion, on the other hand, is based on the period duration of the schedule P, the number of messages being transmitted, the number of required computing nodes and the worst case execution time of the overall functionality or the partial functionality on the computing nodes.

Figure 2:
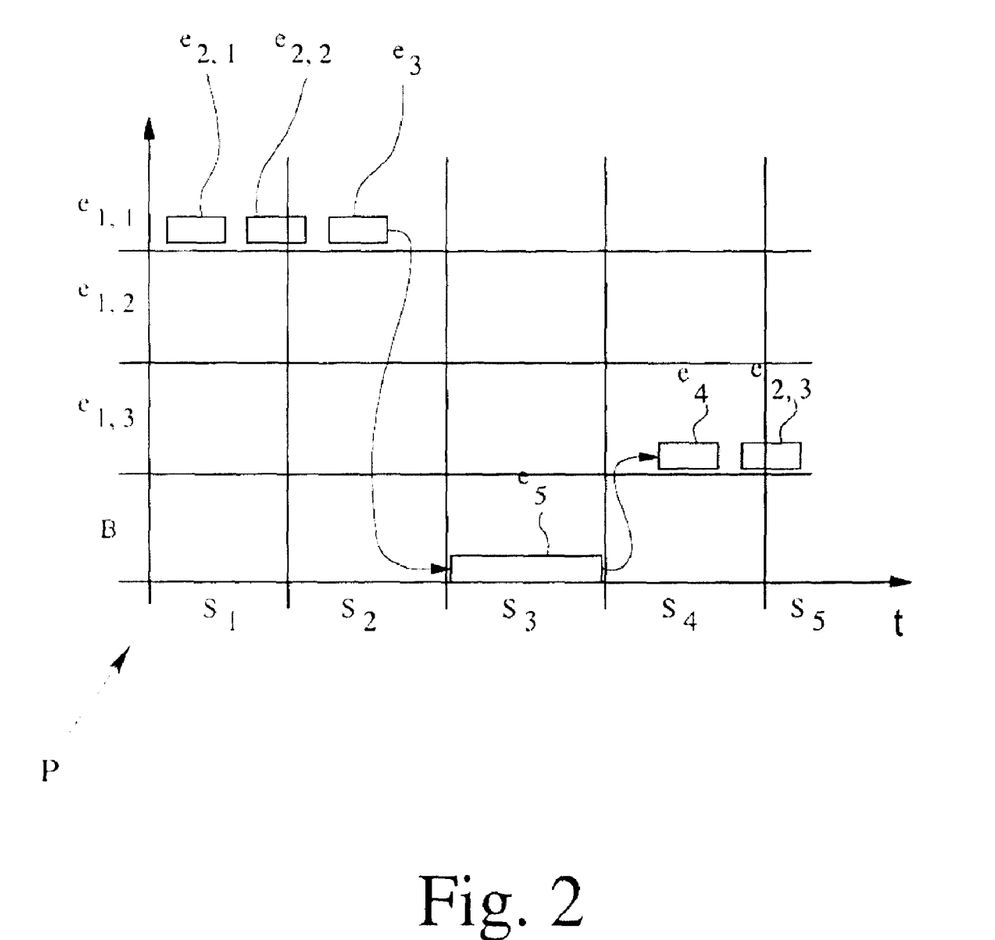
FIG. 2 shows a schematic view of a schedule for a distributed time-control computer system.
Figure 3:
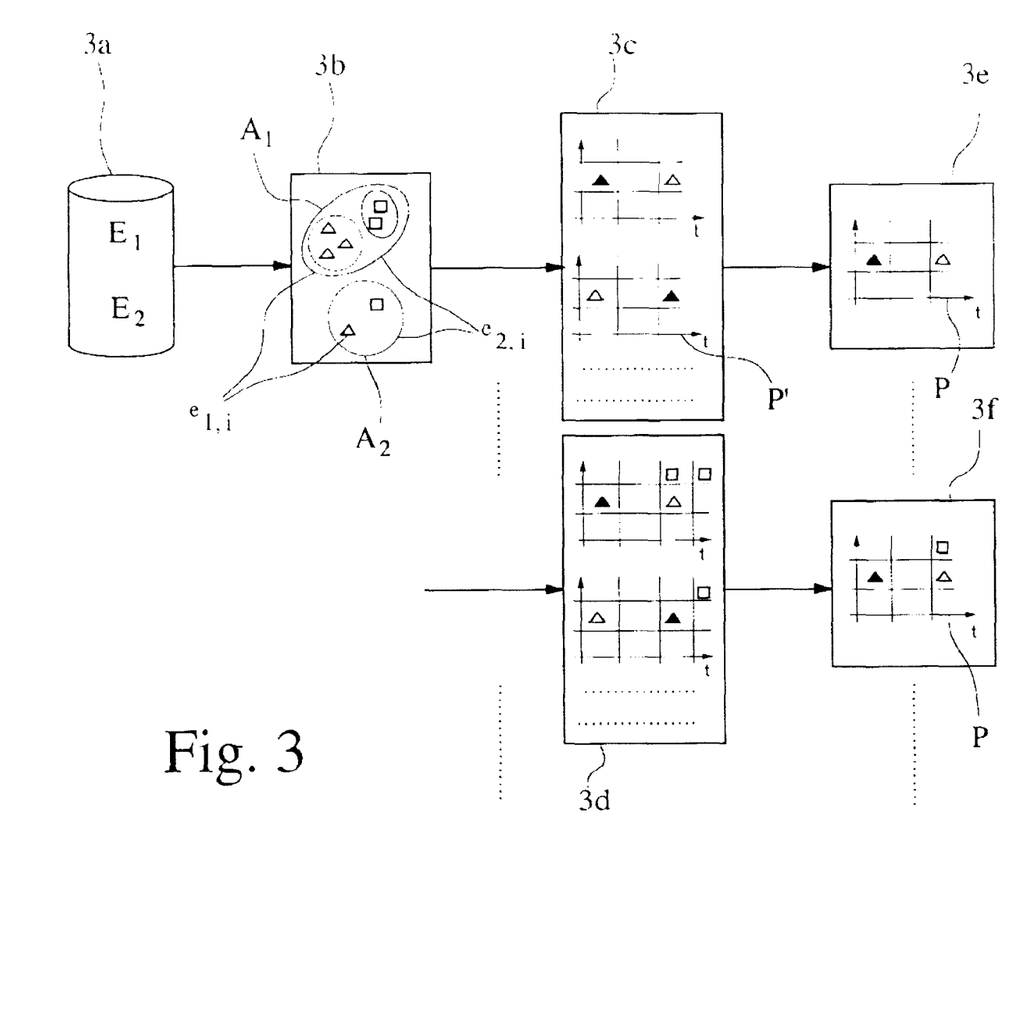
FIG. 3 shows optimization of a schedule according to another preferred practical example of the method according to the invention.
Figure 5:
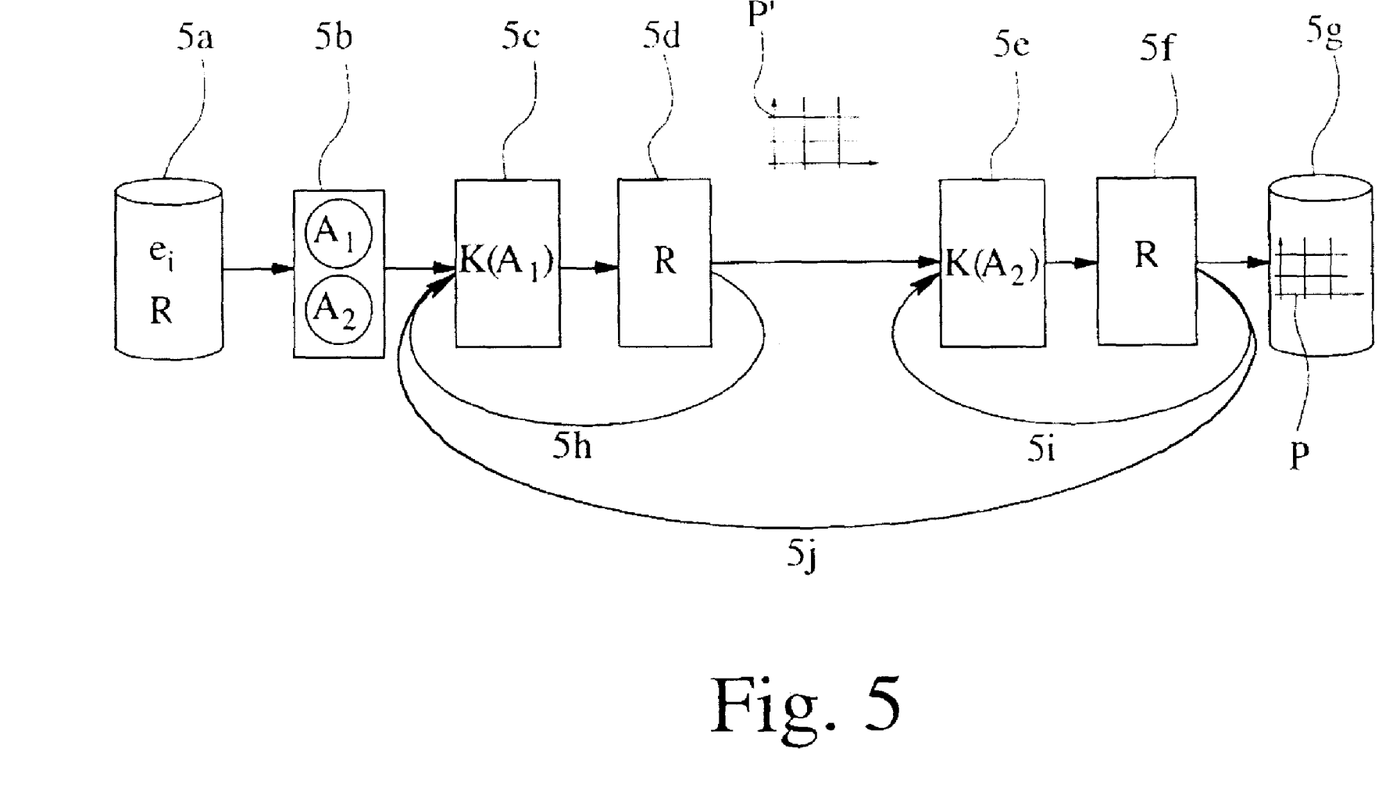
FIG. 5 shows optimization of a schedule according to a last preferred practical example of the method according to the invention.

For a better understanding of FIGS. 1, 3 and 5, a schedule P is shown in FIG. 2, as is often used in time-controlled distributed computer systems. The time axis t is subdivided into time intervals S1-S5, the extent of these time intervals S1-S5 being established or strictly stipulated. The ordinate is also divided into different sections B, e1,1, e1,2 and e1,3, in which the lowermost section B symbolizes communication of the data channel of the time-controlled distributed computer system and the sections e1,1, e1,2 and e1,3 lying above it mark the schedule activity on other elements of the distributed computer system—i.e., on the computing nodes.

It is also shown in FIG. 2 that two application functions e2,1, e2,2 are executed on the node e1,1 and a send function e3 occupies the data channel B in time interval S3 with a message that is prepared at the end of time interval S2. For transmission of the message from node e1,1 via data channel B to node e1,3, the transmission function e5 is responsible. Thereupon, a receive function e4 executed on one of the computing nodes e1,3 receives this message, which is then reused by an application function e2,3 accommodated on the same computing node.

In the terminology of the FlexRay standard, the elements e2,1, e2,2 and e2,3 in FIG. 2 are application tasks, elements e3 and e4 are FTCom tasks (more precisely, FTCom-Sender and FTCom-Receiver tasks), which have the task of writing a message to be sent/received by a computing node into the buffer of the communication controller of the computing node or reading it from this buffer. Element e5 is a transmission task responsible for transmission of a message via the time-controlled FlexRay bus.

The practical example depicted in FIG. 3 shows a similar initial situation as the practical example in FIG. 1. The elements e1,i, e2,i are known to the database 3a, which can be assigned to the element classes E1, E2. In a first process step 3b, the dependences between the elements e1,i, e2,i are recognized, classified and the elements e1,i, e2,i are then assigned to the dependence classes A1, A2. The method according to FIG. 3, however, differs in the subsequent process step 3c from the method of FIG. 1.

The process step c3 from FIG. 3 is characterized by the fact that, during coordination of elements e1,i, e2,i of dependence class A1, only the elements e1,i, e2,i from one of the element classes E1, E2, here element class E1, are initially coordinated separately before the elements of another element class are coordinated. In process step 3c, the three elements e1,i from the dependence claims A1 are coordinated, coordination including time rearrangement and combining (black-filled triangles) of these elements e1,i. In the subsequent process step 3d, on the other hand, the elements e2,i (squares) from dependence class A1 are coordinated.

By means of the practical example of FIG. 3, it is readily apparent that the partial solution obtained in each of the optimization steps 3c, 3d for schedule P, is adopted in the subsequent optimization step without further changes and without being further changed.

In another preferred embodiment of the method according to the invention, which is not shown separately here, the dependence classes Ai include at least a class of simple dependences and the class of complex dependences, in which coordination of the elements of the class of simple dependences occurs before coordination of the elements of the class of complex dependences.

Figure 4A:
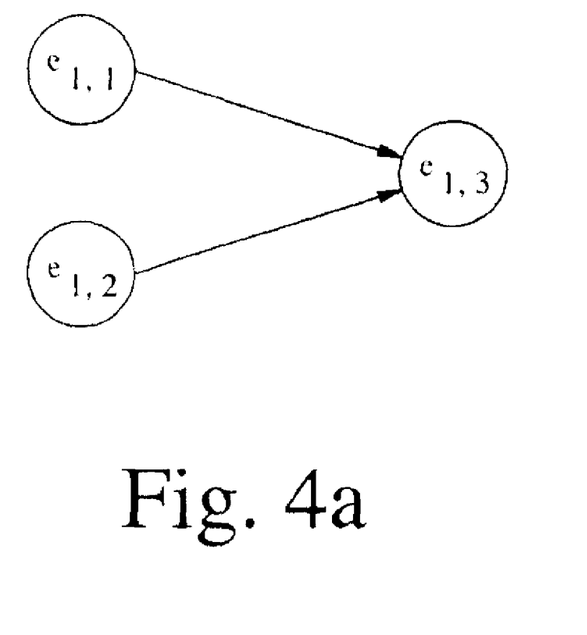
FIG. 4a, 4b shows a depiction of elements in simple and complex dependence

FIG. 4 explains the concept of simple and complex dependence. FIG. 4a shows three elements e1,1, e1,2 and e1,3, which are related to each other, namely so that the elements e1,1 and e1,2 each act upon element e1,3 with a signal. It is readily apparent that the elements e1,1 and e1,2 can be executed independently of each other, since there is no mandatory processing sequence between them. Only when a time stipulation (deadline) exists for the processing time of element e1,3, must elements e1,1 and e1,2 be executed before this time (minus the worst case execution time of element e1,3 and the message transmission between e1,1, e1,2 and e1,3). Such elements are in a simple dependence relation, since they are not dependent on a state or initial value of the other element.

Figure 4B:
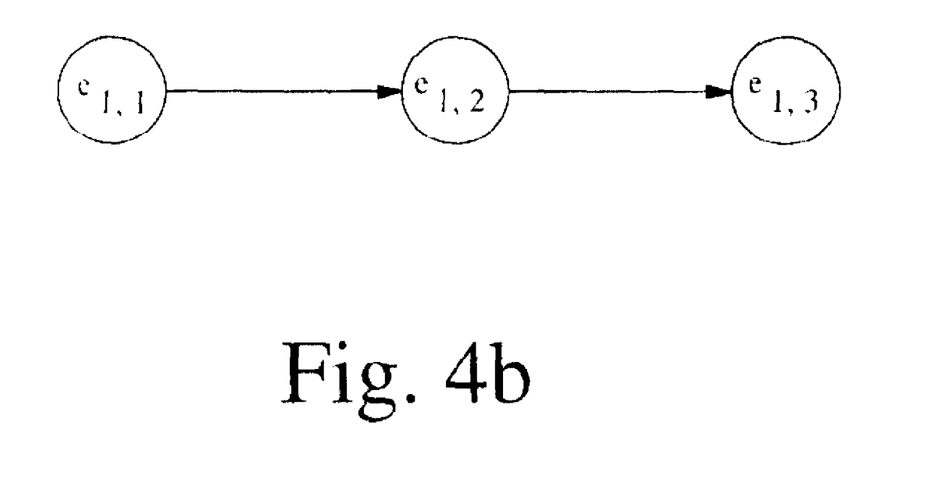

The elements e1,1, e1,2 and e1,3 shown in FIG. 4b, on the other hand, are in a complex dependence, since their processing sequence is necessarily obtained from the stated interaction of the elements: element e1,1 must be calculated first, and then element e1,2, before finally element e1,3 can be calculated. In this case, the elements cannot be arbitrarily coordinated.

Another practical example of the method according to the invention is shown in FIG. 5. Again, the elements ei of the distributed time-controlled computer system are entered in a database 5a, just like the boundary conditions R. The boundary conditions R can include fixed assignments of application functions to computing nodes, maximum period durations for re-execution of a certain functionality, absolute distances between execution of certain (partial) functionalities and many other stipulations. Other boundary conditions are not stipulations in the actual sense, but are simply based on the given equipment features of the time-controlled distributed computer system, for example, the always limited calculation performance of a computing node or the limited transmission capacity of the data channel, via which messages are exchanged between computing nodes.

In a first process step 5b in FIG. 5, the elements ei are assigned in known fashion to dependence classes Ai, in the depicted class the class of simple dependences A1 and the class of complex dependences A2.

In another process step 5c, the elements of a dependence class Ai, here the elements of simple dependences A1, are coordinated K(A1). Coordination can be executed in one step or iteratively in several steps. In process step 5d, each achieved partial solution P' of the optimized schedule P is investigated for violation of the boundary conditions R. If a violation of the boundary conditions R is present, the partial solution P' with the conflict is discarded and the process returns via a loop 5h to coordination K(A1) of the elements of dependence A1. The loop 5h is also used when a partial solution P' for the schedule P is free of conflict, but all the desired elements ei of the dependence class A1 are still not coordinated.

When all elements ei of the dependence class A1 are finally coordinated, the procedure is conducted in the same way with the elements ei of the dependence claims A2 of the complex dependences, specifically based on the partial solution P' of the schedule P, which originates from process steps 5c, 5d (process steps 5e and 5f).

For the case, in which a conflict-free or acceptable solution of the schedule P cannot be found from the partial solution P' originating from process steps 5c and 5d in process steps 5e and 5f, the method according to FIG. 5 proposes to return to coordination of the elements of dependence class A1 via loop 5j, in order to calculate there another partial solution P' of schedule P, which then serves again as the initial position for calculation of a solution of schedule P in process steps 5e and 5f. The result of the method is a created and optimized schedule P, which is entered in a database 5g in the depicted practical example.

The invention claimed is:

1. A method for creating of an optimized schedule for execution of a functionality by a time-controlled distributed computer system, wherein the distributed computer system is based on a FlexRay standard and has at least two computing nodes as a set of structural elements connected via a FlexRay bus and has a set of functional elements with at least one Fault-tolerant communication tasks (FTCom-tasks) comprising at least one of FTCom sender tasks and FTCom receiver tasks, transmission-tasks, signals and messages as the functionality for communication between the at least two computing nodes, wherein the structural and functional elements are of at least one element class and the elements are at least partially dependent on each other, and wherein the at least one element class comprises the FTCom-tasks, the method comprising:

recognizing a simple dependence or a complex dependence between elements of the element class of the FTCom-tasks;

classifying each dependence into a corresponding class of simple dependence or a corresponding class of complex dependence;

assigning each element to a corresponding class of simple dependence or complex dependence;

coordinating the elements of one dependence class with one another in a plurality of combinations, wherein coordinating the elements comprises resorting, assignment and merging of these elements and wherein prior to the coordination of the FTCom-tasks a FlexRay message frame with its own FTCom task is initially assigned to each signal or each signal vector;

determining the optimum schedule of coordinated elements based on a predetermined quality criterion, and creating and transmitting an optimized FlexRay message frame in accordance with the determined optimum schedule comprising a plurality of the coordinated elements by assigning FTCom-tasks to the dependence class of simple dependences and coordinating these FTCom-tasks when they are of the same type (FTCom-Sender tasks, FTCom-Receiver tasks), they can be assigned to same application node, they have identical sending and receiving nodes, and they have the same start times.

2. A method according to claim 1, comprising fully coordinating the elements of at least one dependence class before coordinating the elements of another dependence class.

3. A method according to claim 1, wherein during the coordinating of elements of at least one dependence class, the elements from an element class are separately coordinated or the elements of different element classes are coordinated in combined fashion.

4. A method according to claim 1, wherein optimization is carried out by deterministic and/or stochastic and/or evolutionary optimization methods.

5. A method according to-claim 1, wherein at least one of the following quality criteria is used for optimization: the bus utilization, the period duration of the schedule, the number of messages to be transmitted, the number of required computing nodes and the worst case execution time (WCET) of (partial) functionality.

6. A method according claim 1, wherein optimization is conducted iteratively within at least one dependence class, in which in each iteration step a selection of elements of a dependence class is coordinated, and in which as many iteration steps are conducted as necessary until all elements that can be coordinated of the dependence class are coordinated.

7. A method according to claim 6, wherein at least one of the iteration steps is conducted repeatedly with another element selection from a dependence class and the subsequent iteration step is continued with the coordinated element selection/element selections that achieve the best optimization result in the previous iteration step.

8. A method according to claim 1, comprising checking compliance with stipulated and/or system-intrinsic boundary conditions.

9. A method according to claim 1, wherein the coordinating of the elements of the class of simple dependences occurs before the coordinating of the elements of the class of complex dependences.

10. A method according claim 9, wherein the FTCom tasks are assigned to the dependence class of complex dependences and coordinated, when they are of the same type (FTCom-Sender, FTCom-Receiver), when they can be assigned to the same application node and when their start time intervals intersect.

11. A method according to claim 10, wherein the transmission and/or FTCom tasks are assigned to the dependence class of complex dependences and coordinated, when their start times additionally do not differ from each other by more than a predetermined amount.

12. A method according to claim 9, wherein transmission tasks are assigned to the dependence class of simple dependences and coordinated, when their common signals do not exceed the maximum length of a FlexRay message (frame).

13. A method according to claim 9, wherein transmission tasks are assigned to the dependence class of complex dependences and coordinated, when their common signals do not exceed the maximum length of a FlexRay message (frame), when they can be assigned to identical sending application nodes and when their start time intervals intersect.

14. A non-transitory computer readable media storing a processor executable program with program code for executing all the method steps according to claim 1, when the processor executable program is run on a data processing system.

15. A method for creating of an optimized schedule for execution of a real time functionality by a time-controlled distributed computer system, wherein the distributed computer system is based on a FlexRay standard and has at least two networked computing nodes representing structural elements connected via a FlexRay bus and has a set of functional elements for signals and messaging between the at least two networked computing nodes, including at least one messaging task, a transmission-task, and an applications-task, wherein the structural and functional elements are of at least one element class and the elements are at least partially dependent on each other, and wherein at least one element class comprises the messaging task, the method comprising:

recognizing a simple dependence or a complex dependence between elements of the element class of the messaging task;

classifying each dependence into a corresponding class of simple dependence or a corresponding class of complex dependence;

assigning each element to a corresponding class of simple dependence or complex dependence;

coordinating the elements of one dependence class with one another in a plurality of combinations, wherein coordinating the elements comprises resorting, assignment and merging of these elements and wherein prior to the coordination of the messaging tasks a FlexRay message frame with its own messaging task is initially assigned to each signal;

determining the optimum schedule of coordinated elements based on a predetermined quality criterion, and creating and transmitting an optimized FlexRay message frame in accordance with the determined optimum schedule comprising a plurality of the coordinated elements by assigning messaging tasks to the dependence class of simple dependences and coordinating these tasks when they are of the same type, they can be assigned to the same application node, they have identical sending and receiving nodes, and they have the same start times.

* * * * *